United States Patent
Cozma et al.

(10) Patent No.: US 11,768,749 B2
(45) Date of Patent: Sep. 26, 2023

(54) ANALYTICS-BASED ANOMALY DETECTION

(71) Applicant: LENOVO Enterprise Solutions (Singapore) PTE. LTD., New Tech Park (SG)

(72) Inventors: Alexandru Cozma, Bucharest (RO); Jeffery Van Heuklon, Rochester, MN (US); Sumeet Kochar, Cary, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 248 days.

(21) Appl. No.: 17/219,508

(22) Filed: Mar. 31, 2021

(65) Prior Publication Data

US 2022/0318115 A1 Oct. 6, 2022

(51) Int. Cl.
   *G06F 11/30* (2006.01)
   *G06F 11/34* (2006.01)
   *G06N 20/00* (2019.01)
   *G06F 11/32* (2006.01)

(52) U.S. Cl.
   CPC .......... *G06F 11/3082* (2013.01); *G06F 11/32* (2013.01); *G06F 11/3409* (2013.01); *G06N 20/00* (2019.01); *G06F 2201/81* (2013.01)

(58) Field of Classification Search
   CPC .. G06F 11/3082; G06F 11/32; G06F 11/3409; G06F 2201/81; G06F 11/3006; G06F 11/3447; G06N 20/00
   See application file for complete search history.

(56) References Cited

U.S. PATENT DOCUMENTS

| | | | |
|---|---|---|---|
| 9,454,321 B1* | 9/2016 | Smaldone | G06F 3/061 |
| 2015/0039260 A1* | 2/2015 | Niskanen | H03M 7/3062 702/141 |
| 2018/0074893 A1* | 3/2018 | Vaidhyanathan | G11C 29/52 |
| 2019/0025813 A1* | 1/2019 | Cella | H04L 1/1854 |
| 2019/0306375 A1* | 10/2019 | Tang | H04N 1/6019 |
| 2022/0309741 A1* | 9/2022 | Barreiro | G06T 1/20 |
| 2023/0222919 A1* | 7/2023 | Chen | G08G 3/02 340/984 |

* cited by examiner

*Primary Examiner* — Matthew M Kim
*Assistant Examiner* — Matthew N Putaraksa
(74) *Attorney, Agent, or Firm* — Kunzler Bean & Adamson; Bruce R. Needham

(57) ABSTRACT

Apparatuses, methods, systems, and program products are disclosed for analytics-based anomaly detection. An apparatus includes a processor and a memory that stores code executable by the processor. The code is executable by the processor to receive measurement data for a component of a device, determine a compression rate of the received measurement data by applying a compression algorithm to the measurement data, and generate an alert indicating a possible anomaly in an operation of the component represented by the measurement data in response to the determined compression rate satisfying a threshold compression rate for the at least one condition of the component.

20 Claims, 7 Drawing Sheets

ANALYTICS-BASED ANOMALY DETECTION

FIELD

The subject matter disclosed herein relates to computing devices and more particularly relates to analytics-based anomaly detection in computing devices.

BACKGROUND

A device may be made up of various components that cause the device to operate. Failure or abnormal behavior of a component may cause the device to operate improperly.

BRIEF SUMMARY

An apparatus for analytics-based anomaly detection is disclosed. A method and computer program product also perform the functions of the apparatus. An apparatus, in one embodiment, includes a processor and a non-volatile memory that stores code executable by the processor. In one embodiment, the code is executable by the processor to receive measurement data for a component of a device. The measurement data may include measurements for at least one condition of the component that is monitored over a defined time interval.

In some embodiments, the code is executable by the processor to determine a compression rate of the received measurement data by applying a compression algorithm to the measurement data. The compression rate may indicate a compressed size of the measurement data as a result of applying the compression algorithm relative to an original size of the measurement data. In certain embodiments, the code is executable by the processor to generate an alert that indicates a possible anomaly in an operation of the component represented by the measurement data in response to the determined compression rate satisfying a threshold compression rate for the at least one condition of the component. Satisfying the threshold compression rate, in further embodiments, indicates an abnormal operating state of the component.

A method for analytics-based anomaly detection, in one embodiment, includes receiving, by a processor, measurement data for a component of a device. The measurement data may include measurements for at least one condition of the component that is monitored over a defined time interval. In some embodiments, the method includes determining a compression rate of the received measurement data by applying a compression algorithm to the measurement data. The compression rate may indicate a compressed size of the measurement data as a result of applying the compression algorithm relative to an original size of the measurement data. In certain embodiments, the method includes generating an alert that indicates a possible anomaly in an operation of the component represented by the measurement data in response to the determined compression rate satisfying a threshold compression rate for the at least one condition of the component. Satisfying the threshold compression rate, in further embodiments, indicates an abnormal operating state of the component.

A program product for analytics-based anomaly detection, in one embodiment, includes a non-volatile computer readable storage medium and program code. The program code, in one embodiment, is configured to be executable by a processor to perform operations. In one embodiment, the operations include receiving measurement data for a component of a device. The measurement data may include measurements for at least one condition of the component that is monitored over a defined time interval. In some embodiments, the operations include determining a compression rate of the received measurement data by applying a compression algorithm to the measurement data. The compression rate may indicate a compressed size of the measurement data as a result of applying the compression algorithm relative to an original size of the measurement data. In certain embodiments, the operations include generating an alert that indicates a possible anomaly in an operation of the component represented by the measurement data in response to the determined compression rate satisfying a threshold compression rate for the at least one condition of the component. Satisfying the threshold compression rate, in further embodiments, indicates an abnormal operating state of the component.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
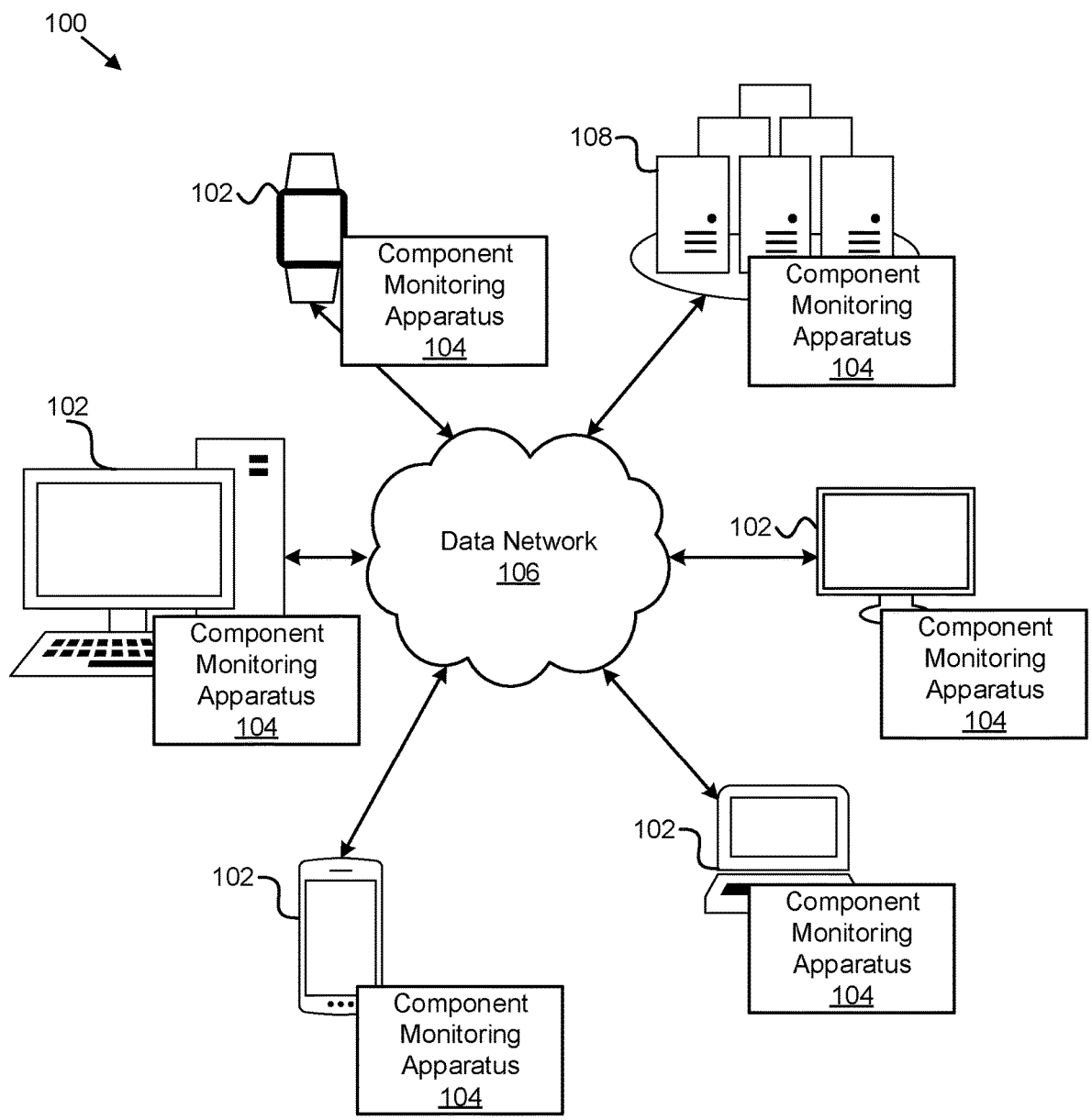
FIG. 1 a schematic block diagram illustrating one embodiment of a system for analytics-based anomaly detection.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

The description of elements in each figure may refer to elements of proceeding figures. Like numbers refer to like elements in all figures, including alternate embodiments of like elements.

An apparatus, in one embodiment, includes a processor and a non-volatile memory that stores code executable by the processor. In one embodiment, the code is executable by the processor to receive measurement data for a component of a device. The measurement data may include measurements for at least one condition of the component that is monitored over a defined time interval.

In some embodiments, the code is executable by the processor to determine a compression rate of the received measurement data by applying a compression algorithm to the measurement data. The compression rate may indicate a compressed size of the measurement data as a result of applying the compression algorithm relative to an original size of the measurement data. In certain embodiments, the code is executable by the processor to generate an alert that indicates a possible anomaly in an operation of the component represented by the measurement data in response to the determined compression rate satisfying a threshold compression rate for the at least one condition of the component. Satisfying the threshold compression rate, in further embodiments, indicates an abnormal operating state of the component.

In one embodiment, the compression algorithm that is used to determine the compression rate for the measurement data is configured to create a compressed data set by identifying and storing values that fall outside of a range that is dynamically calculated for each value in the measurement data based on a height of the measurement data.

In certain embodiments, the compression algorithm determines the compression rate by: determining a minimum value and a maximum value of the measurement data, calculating a height of the measurement data by determining a difference between the maximum value and the minimum value, determining a delta that describes a difference in level using a logarithmic function of the calculated height that determines whether a value is removed from the measurement data, creating the compressed data set by, for every value in the measurement data, removing a current value from the measurement data in response to the current value falling within the range defined as (previous value−delta) <the current value<(previous value+delta) where the previous value is a most recent value placed in the compressed data set, and determining the compression rate by calculating (100−(length of the compressed data set)*100/length of measurement data).

In one embodiment, the code is executable by the processor to receive new measurement data for the component on a continuous basis, determine a new compression rate, using the compression algorithm, based on the received new measurement data, and generate an alert in response to the determined new compression rate satisfying the threshold compression rate for the at least one condition of the component.

In one embodiment, the code is executable by the processor to check an operating state of at least one other component of the device that is related to the component for a same time interval in response to the determined compression rate satisfying the threshold compression rate and generate the alert in response to the operating state being normal for the at least one other component of the device for the same time interval.

In certain embodiments, the code is executable by the processor to check for system alerts associated with the component that are triggered during a same time interval in response to the determined compression rate satisfying the threshold compression rate and generate the alert in response to other system alerts associated with the component being triggered for the same time interval.

In various embodiments, the code is executable by the processor to use machine learning to analyze the measurement data and the determined compression rate to generate at least one prediction associated with the operating state of the component. The prediction may be associated with an operating state of the component and provided as part of the generated alert.

In one embodiment, the machine learning is trained using training data that includes measurement and other operating data from a plurality of different devices that have components that are comparable to the components of the device. In some embodiments, the code is executable by the processor to predict, using the machine learning, an estimate of when the component that generated the alert will fail, the determined estimate provided as part of the generated alert.

In further embodiments, the code is executable by the processor to predict, using the machine learning and based on the measurement data and the determined compression rate, a cost of operation for the device. The cost of operation may include a per-user cost of the device in a hardware-as-a-service environment.

In one embodiment, the code is executable by the processor to determine a severity level for the generated alert based on the determined compression rate relative to one of a plurality of different compression rate thresholds. Different severity levels may each be associated with one of the plurality of different compression rate thresholds. In one embodiment, the code is executable by the processor to determine one or more recommendations associated with the component based on the severity level for the generated alert.

In various embodiments, the code is executable by the processor to determine the threshold compression rate based on at least one of user input, a set of baseline measurement data that is received when the component is installed, manufacturer specifications for the component, and measurement data for related components. In certain embodiments, the code is executable by the processor to include details about at least one specification of the component as part of the generated alert and provide at least one recommendation for correcting the possible anomaly in the component based on the details about the at least one specification.

A method for analytics-based anomaly detection, in one embodiment, includes receiving, by a processor, measurement data for a component of a device. The measurement data may include measurements for at least one condition of the component that is monitored over a defined time interval. In some embodiments, the method includes determining a compression rate of the received measurement data by applying a compression algorithm to the measurement data. The compression rate may indicate a compressed size of the measurement data as a result of applying the compression algorithm relative to an original size of the measurement data. In certain embodiments, the method includes generating an alert that indicates a possible anomaly in an operation of the component represented by the measurement data in response to the determined compression rate satisfying a threshold compression rate for the at least one condition of the component. Satisfying the threshold compression rate, in further embodiments, indicates an abnormal operating state of the component.

In one embodiment, the compression algorithm that is used to determine the compression rate for the measurement data is configured to create a compressed data set by identifying and storing values that fall outside of a range that is dynamically calculated for each value in the measurement data based on a height of the measurement data.

In one embodiment, the method includes receiving new measurement data for the component on a continuous basis, determining a new compression rate, using the compression algorithm, based on the received new measurement data, and generating an alert in response to the determined new compression rate satisfying the threshold compression rate for the at least one condition of the component.

In various embodiments, the method includes checking for system alerts associated with the component that are triggered during a same time interval in response to the determined compression rate satisfying the threshold compression rate and generating the alert in response to other system alerts associated with the component being triggered for the same time interval.

In one embodiment, the method includes using machine learning to analyze the measurement data and the determined compression rate to generate at least one prediction associated with the operating state of the component. The prediction may be associated with an operating state of the component and provided as part of the generated alert.

A program product for analytics-based anomaly detection, in one embodiment, includes a non-volatile computer readable storage medium and program code. The program code, in one embodiment, is configured to be executable by a processor to perform operations. In one embodiment, the operations include receiving measurement data for a component of a device. The measurement data may include measurements for at least one condition of the component that is monitored over a defined time interval. In some embodiments, the operations include determining a compression rate of the received measurement data by applying a compression algorithm to the measurement data. The compression rate may indicate a compressed size of the measurement data as a result of applying the compression algorithm relative to an original size of the measurement data. In certain embodiments, the operations include generating an alert that indicates a possible anomaly in an operation of the component represented by the measurement data in response to the determined compression rate satisfying a threshold compression rate for the at least one condition of the component. Satisfying the threshold compression rate, in further embodiments, indicates an abnormal operating state of the component.

FIG. 1 a schematic block diagram illustrating one embodiment of a system 100 for analytics-based anomaly detection. In one embodiment, the system 100 includes one or more information handling devices 102, one or more component monitoring apparatuses 104, one or more data networks 106, and one or more servers 108. In certain embodiments, even though a specific number of information handling devices 102, component monitoring apparatuses 104, data networks 106, and servers 108 are depicted in FIG. 1, one of skill in the art will recognize, in light of this disclosure, that any number of information handling devices 102, component monitoring apparatuses 104, data networks 106, and servers 108 may be included in the system 100.

In one embodiment, the system 100 includes one or more information handling devices 102. The information handling devices 102 may be embodied as one or more of a desktop computer, a server device, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device that includes a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In general, in one embodiment, the component monitoring apparatus 104 is configured to receive measurement data for a component of an information handling device compress the measurement data and calculate a compression rate for the measurement data, and generate an alert if the calculated compression rate satisfies a predefined compression rate threshold where the alert indicates a possible anomaly with the normal operating state of the component.

In this manner, the component monitoring apparatus 104 monitors the health, operating state, operating conditions, and/or the like of various software and hardware components of an information handling device 102 based on analytics that are captured, measured, sensed, or the like from the components of the information handling device 102, which, in certain embodiments, may indicate, predict, forecast, estimate, or the like a probability, likelihood, or the like of the component failing, of an abnormality with the component, of an anomaly with the component or with the system in general, and/or the like. The component monitoring apparatus 104 is described in more detail below with reference to FIGS. 2 and 3.

In certain embodiments, the component monitoring apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the component monitoring apparatus 104 may include a power interface, a wired and/or wireless network interface, a graphical interface that attaches to a display, and/or a semiconductor integrated circuit device as described below, configured to perform the functions described herein with regard to the component monitoring apparatus 104.

The component monitoring apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the component monitoring apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the component monitoring apparatus 104.

The semiconductor integrated circuit device or other hardware appliance of the component monitoring apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the component monitoring apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may be configured to record, capture, store, or the like measurement data for various components of the server 108 and transmit the measurement data to other devices for processing, analysis, and/or the like.

Figure 2:
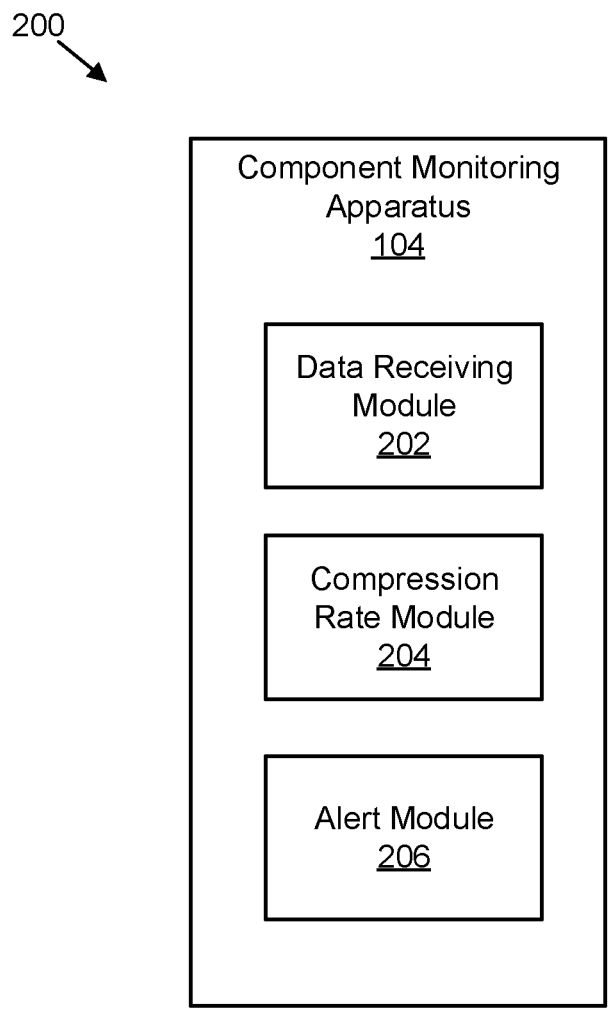
FIG. 2 is a schematic block diagram of one embodiment of an apparatus for analytics-based anomaly detection.

FIG. 2 depicts a schematic block diagram of one embodiment of an apparatus 200 for analytics-based anomaly detection. In one embodiment, the apparatus 200 includes an instance of a component monitoring apparatus 104. The component monitoring apparatus 104 includes a data receiving module 202, a compression rate module 204, and an alert module 206, which are described in more detail below.

In one embodiment, the data receiving module 202 is configured to receive measurement data for a component of a device, e.g., a computing device, an electronic device, and/or other types of machines. In one embodiment, a component of a device may include a hardware component and the at least one condition is associated with a parameter of the hardware component. For example, the hardware component may include a power supply, a processor, a network card, a graphic card, a fan, and/or the like, and the at least one condition may include a temperature, a power usage, and/or the like that is represented by a parameter for the measurement data.

In certain embodiments, the component of the device includes software component such as a virtualization component executing on the device and the at least one condition is associated with a parameter of the virtualization component. For instance, the virtualization component may be a guest operating system running on a host, a hypervisor, and/or the like and the at least one condition may include a workload, a processing speed, a processing bandwidth, a network bandwidth, a system latency, and/or the like. Other software components may be monitored including an operating system, a web browser, an application, a graphical desktop environment, and/or the like.

As used herein, measurement data may refer to data associated with the at least one condition of the component that is sampled, captured, sensed, stored, saved, or the like periodically. For example, the measurement data for a power supply may include temperature readings that are sensed using a thermometer or other temperature sensor in real-time, continuously, every second, every ten seconds, or the like.

The data receiving module 202 may query, access, or otherwise receive the measurement data for the component from the device that includes the component, e.g., the data receiving module 202 may be located on the same device where the component is located, may be located on a different device that is connected to the device where the component is located, and/or the like. The data receiving module 202 may query, access, or otherwise receive the measurement data for the component for a particular time interval, time range, data range, or the like, e.g., the previous ten minutes; may receive measurement data continuously, in real-time, as the measurement data is captured or sensed; and/or the like. For example, the data receiving module 202 may submit a query for the measurement data and specify as part of the query a time range or interval for the measurement data, e.g., the last ten minutes, yesterday between 1:00 PM and 1:15 PM, and/or the like.

Furthermore, the data receiving module 202 may specify which parameters of the measurement data to receive, such as a temperature parameter, e.g., a temperature of a particular component, area, region, or the like of the component; a power usage rate; a bandwidth; a processor utilization or capacity; a memory utilization, capacity, or the like; a hypervisor utilization or workload; a virtualization utilization or capacity; and/or the like.

In one embodiment, the measurement data for the various components may have different formats, e.g., the measurement data may include numbers, letters, units, or the like that are scaled differently based on the component. In such an embodiment, the data receiving module 202 may normalize, translate, convert, or the like the measurement data to a format that can be processed, read, analyzed, or the like other modules such as the compression rate module 204, described below.

In one embodiment, the compression rate module 204 is configured to determine a compression rate of the received measurement data by applying a compression algorithm to the measurement data. As used herein, the compression rate may refer generally to a data compression ratio defined by the ratio between the uncompressed size of the measurement data set and the compressed size of the measurement data set. In certain embodiments, the compression rate indicates a compressed size of the measurement data as a result of applying the compression algorithm relative to an original size of the measurement data.

In certain embodiments, the compression algorithm may be a lossy compression algorithm such as transform coding, discrete cosine transform, discrete wavelet transform, fractal compression, or the like. In further embodiments, the compression algorithm may be a lossless compression algorithm such as run length encoding, Lempel-Ziv-Welch, Huffman coding, arithmetic encoding, or the like.

In some embodiments, however, the compression algorithm includes a custom compression algorithm that is used to determine the compression rate for a compressed set of the measurement data. In one embodiment, the custom compression algorithm only keeps important measurement data and drop unnecessary or redundant values such that trends, peaks, valleys, and/or other variations in the measurement data are preserved in the compressed measurement data set. In such an embodiment, the compression rate module 204 creates a compressed data set by identifying and storing values that fall outside of a range that is dynamically calculated for each value in the measurement data based on a height of the measurement data.

In particular, the compression rate module 204 uses a custom compression algorithm that determines the compression rate by:
- determining a minimum value and a maximum value of the measurement data (e.g., the smallest and largest values in the measurement data set);
- calculating the height of the measurement data by determining a difference between the maximum value and the minimum value;
- determining a delta value that is a difference in level that determines whether a value is removed from the measurement data by calculating, using, or taking a logarithmic function (e.g., $\log_2$) of the calculated height;
- creating the compressed data set by, for every value in the measurement data, removing a current value from the measurement data in response to the current value falling within the range defined as (previous value−delta)<the current value<(previous value+delta), wherein the previous value is a most recent value placed in the compressed data set; and
- calculating the compression rate by the equation/formula (100−(length of the compressed data set)*100/length of measurement data).

In one embodiment, the alert module 206 is configured to generate an alert indicating a possible anomaly in an operation of the component represented by the measurement data in response to the determined compression rate satisfying a threshold compression rate for the at least one condition of the component. The alert module 206 may receive the compression rate for the measurement data, as determined by the compression algorithm, and may compare the compression rate to a predefined, calculated, received, stored, or the like threshold compression rate. In certain embodiments, satisfying the threshold compression rate indicates an abnormal operating state of the component associated with the measurement data.

Figure 3:
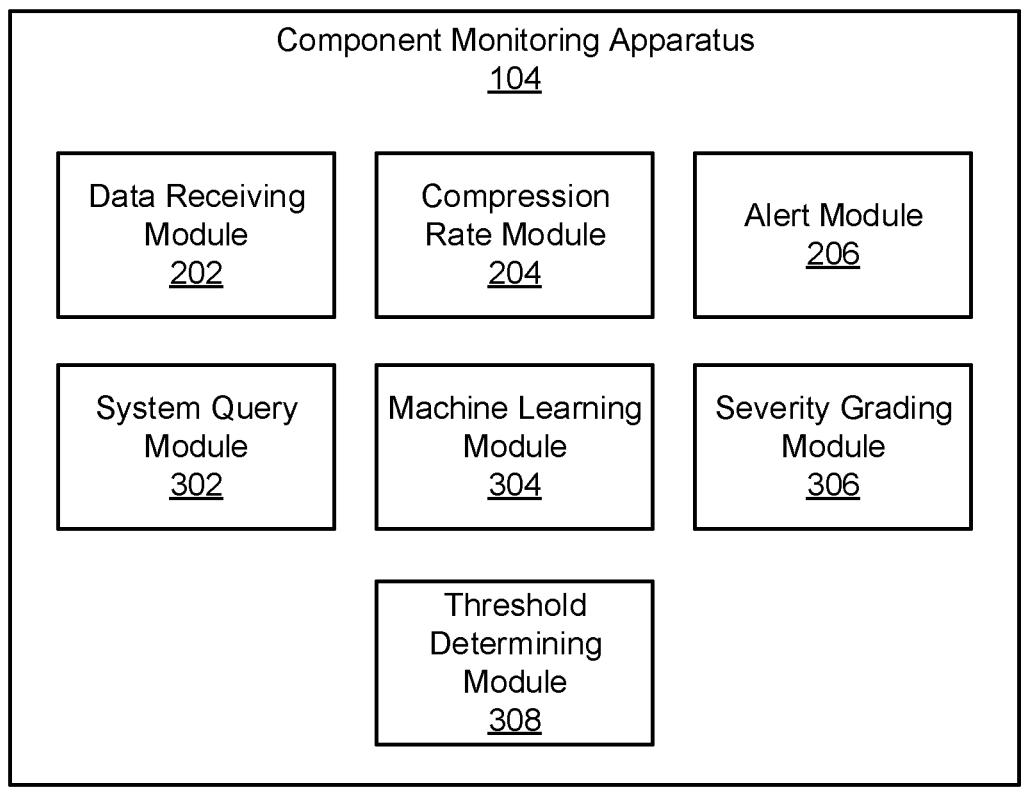
FIG. 3 is a schematic block diagram of one embodiment of an apparatus for analytics-based anomaly detection.

For example, as illustrated in FIG. 3 below, a higher compression rate may indicate a normal operating state of a component because the data will not exhibit a lot of variation, e.g., low peaks and valleys, such that the data may be redundant, and a therefore highly compressible. On the other hand, if a component is operating abnormally, e.g., large fluctuations in temperature, power usage, or processing, then the measurement data may exhibit large variations, e.g., high peaks and valleys, which may result in a low compression rate in order to maintain the variations in the measurement data. The threshold compression rate may be a cutoff value that suggests whether the compression rate indicates an abnormal or a normal operating state of a component. In this manner, the component monitoring apparatus 104 may be able to predict, estimate, forecast, or the like a looming failure or other abnormality in a component of a device.

In one embodiment, the data receiving module 202 receives new measurement data for the component on a continuous basis, e.g., in real-time, consistently every second, every five seconds, every ten seconds, and/or the like. In response to receiving the new measurement data, the compression rate module 204, in certain embodiments determines or calculates a determine a new compression rate, using the custom compression algorithm described above or a different compression algorithm. In further embodiments, the alert module 206 generates an alert in response to the determined new compression rate satisfying the threshold compression rate for the at least one condition of the component.

In one embodiment, the alert that the alert module 206 generates includes details about at least one specification of the component as part of the generated alert. For instance, the alert may include a message, notification, or the like that includes a model number, a serial number, a version number, an identifier, a normal operating range for the component (e.g., a normal operating temperature range, power usage range, and/or the like), and/or the like. In certain embodiments, the alert module 206 may use the specification information to determine, check, lookup, and/or the like online resources, local databases, and/or the like for recommendations for correcting the possible anomaly in the component based on the details about the at least one specification. For example, the alert module 206 may scrape, access, visit, or the like websites for product information, user manuals, alternative products, advice or hints for correcting the issue, costs to replace the component, and/or the like.

In one embodiment, the alert module 206 logs the generated alert as an event in an event log associated with a system, e.g., a computing device, server, hypervisor, or the like; associated with the component; and/or the like. In further embodiments, the alert module 206 sends the generated alert as a notification such as a push notification, a text message, an email message, an instant message, and/or the like. In one embodiment, the alert module 206 includes additional information with the alert such as the compression rate of the measurement data, the compression rate threshold, measurement data trends for the component, the condition being monitored and the parameters of the condition associated with the measurement data, and/or the like.

In this manner, the component monitoring apparatus 104 monitors the health, operating state, operating conditions, and/or the like of various software and hardware components of an information handling device 102 based on data that is captured, measured, sensed, or the like from the components of the information handling device 102, compressed to determine a data compression rate, and compared with a compression rate threshold, which, in certain embodiments, may indicate, predict, forecast, estimate, or the like a probability, likelihood, or the like of the component failing, of an abnormality with the component, of an anomaly with the component or with the system in general, and/or the like.

FIG. 3 depicts a schematic block diagram of one embodiment of an apparatus 300 for analytics-based anomaly detection. In one embodiment, the apparatus 300 includes an instance of a component monitoring apparatus 104. The component monitoring apparatus 104 includes a data receiving module 202, a compression rate module 204, and an alert module 206, which may be substantially similar to the data receiving module 202, the compression rate module 204, and the alert module 206 described above with reference to FIG. 2. In one embodiment, the component monitoring apparatus 104 includes a system query module 302, a machine learning module 304, a severity grading module 306, and a threshold determining module 308, which are described in more detail below.

In one embodiment, the system query module 302 is configured to check an operating state of at least one other component of the device, system, or the like that is related to the component for a same time interval in response to the determined compression rate satisfying the threshold compression rate and generate the alert in response to the operating state being normal for the at least one other component of the device for the same time interval.

For example, the system query module 302 may check measurement data describing a utilization of a processor to see if the measurement data corresponds with measurement data for a power usage rate of a power supply for the same time interval. If the compression rate for the power usage rate data of the power supply satisfies the compression rate threshold for the power usage rate and the compression rate for the processor utilization data for the processor also satisfies the compression rate threshold for the processor, then the fluctuations in the power usage rate may be due to the processor utilization being up, and therefore the power supply may be operating normally. However, if the compression rate of the power usage data satisfies the compression rate threshold for the power usage rate and the compression rate of the processor utilization data does not satisfy the compression rate threshold for the processor, then the power supply may be operating abnormally. The alert module 302 may check and compare the compression rates of measurement data for a plurality of different combinations of related components to determine whether the compression rates indicate that the components are operating normally.

In one embodiment, the system query module 302 checks for system alerts associated with the component that are triggered during a same time interval in response to the determined compression rate satisfying the threshold compression rate and generates the alert in response to other system alerts associated with the component being triggered for the same time interval. For example, if the compression rate for measured temperature data for a system satisfies a compression rate threshold for the temperature of the system and the system, e.g., the operating system, has a system alert, log, message, warning, or the like that indicates that the temperature for the system is too high, e.g., is above a threshold temperature, then the alert module 206 may generate an alert to indicate that something in the system is behaving abnormally and causing high temperatures in the system.

In one embodiment, the machine learning module 304 is configured to use machine learning to analyze the measurement data and the determined compression rate to generate at least one prediction associated with the operating state of the component. As used herein, machine learning may refer to a device's or a system's ability to automatically learn and improve from experience without being explicitly programmed. Machine learning focuses on the development of computer programs that can access data and use it to learn for themselves. Various machine learning algorithms may be employed including supervised or unsupervised learning algorithms, neural networks, and/or other deep learning algorithms.

In one embodiment, the machine learning uses a machine learning model that is trained on previously collected, captured, saved, or the like measurement data for a component. For instance, in one embodiment, the machine learning is trained using training data that includes measurement and other operating data (e.g., usage data, compression rate data, or the like) from a plurality of different devices that have components that are comparable to the components of the device. The training data may be collected from a plurality of different systems, e.g., from other customers in a crowd-sourcing-type manner, that include the same or substantially similar components.

Based on the trained machine learning model, the machine learning module 304 may accept as input measurement data, either an original data set or a compressed data set, a compression rate for the data, and/or the like, for a component and generate predictions, estimates, forecasts, and/or the like associated with an operating state of the component and provided as part of the generated alert, e.g., a prediction of when the component will fail, an estimate of how long the component will last, and/or the like. In such an embodiment, the alert module 206 generates an alert based on the prediction, e.g., an alert that specifies that the component is predicted to fail within three days.

In one embodiment, the machine learning module 304 predicts, using the machine learning and based on the measurement data and the determined compression rate, a cost of operation for the device. As used herein, the cost of operation may refer to a per-user cost of the device in a hardware-as-a-service environment. Hardware-as-a-service, as used herein, may refer to a procurement model that is similar to leasing or licensing in which hardware that belongs to a managed service provider ("MSP") is installed at a customer's site and a service level agreement ("SLA") defines the responsibilities of both parties. The machine learning module 304 may predict, using the machine learning, lifetimes of components of the device, estimated failure rates and failure times for the components, and/or the like.

In one embodiment, the severity grading module 306 is configured to determine a severity level for the generated alert based on the determined compression rate relative to one of a plurality of different compression rate thresholds. In such an embodiment, different severity levels are each associated with one of the plurality of different compression rate thresholds. For example, on a scale of 1-100, there may be thresholds set at 25, 50, and 75, which each indicate a different severity level, e.g., critical. major, moderate, minor. Depending on where the compression rate falls on the scale relative to the thresholds determines the severity of the operating state of the component.

The severity grading module 306 may use the determined severity to determine at least one recommendation for the component. For instance, if the compression rate for a power supply is at a critical level, indicating that the power supply will fail soon, the alert module 206 may indicate in the generated alert that the power supply should be replaced ASAP. On the other hand, if the compression rate for the power supply is at a minor severity level, the alert module 206 may indicate in the generated alert that the power supply should be closely monitored for further abnormal activity.

In one embodiment, the alert module 306 generates different alerts based on the severity levels. For instance, a major or critical severity level may necessitate the alert module 206 to send a push notification directly to a user, e.g., a system administrator. The alert module 206, on the other hand, may log an alert in an event log for minor or moderate severity levels.

In one embodiment, the threshold determining module 308 is configured to determine the threshold compression rate based on at least one of user input, a set of baseline measurement data that is received when the component is installed, manufacturer specifications for the component, and measurement data for related components. For instance, the threshold module 308 may prompt a user for a compression rate threshold, may determine the threshold based on a sample of measurement data captured for the component when the component is first installed or executed, may determine the threshold by checking a manufacturer's specifications for normal operating ranges for the component (e.g., from a website or user manual), and/or may reference measurement data for the same or similar components for a plurality of different devices to determine the threshold compression rate.

Figure 4A:
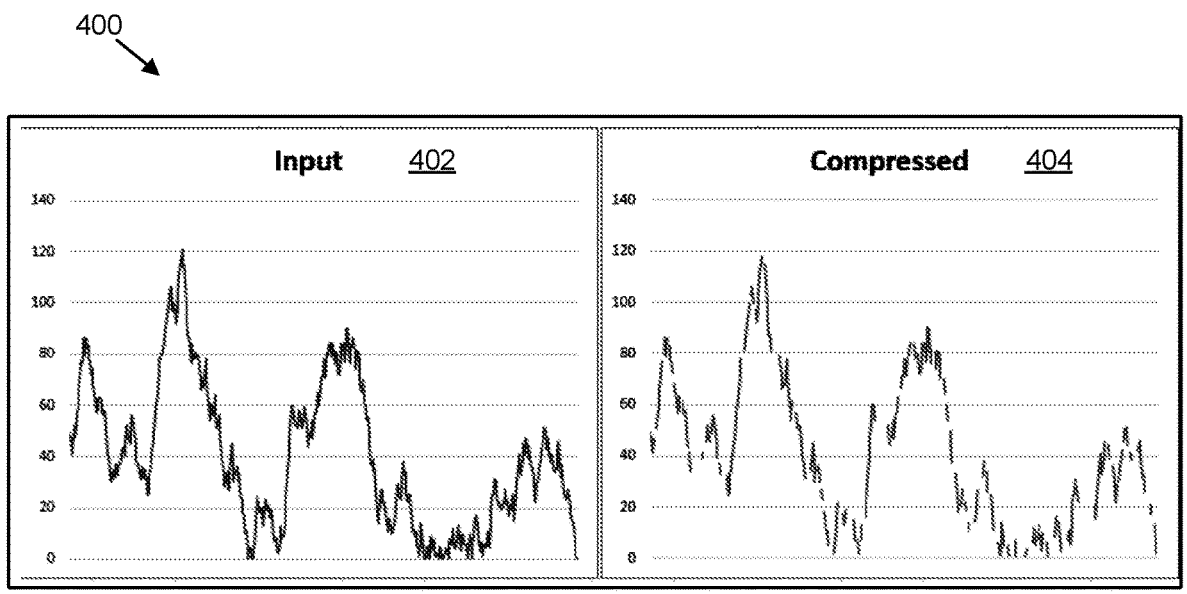
FIG. 4A depicts one example embodiment of a graph of measurement data before and after compression.

FIG. 4A depicts one example embodiment 400 of a graph of measurement data before and after compression. As illustrated in FIG. 4A, an original measurement data set 402 for a particular time interval is shown to have large peaks and valleys, indicating some kind of activity with the component. The compressed data set 404, based on the original measurement data may exhibit similar peaks and valleys because there is not much, if any, redundant data in the original data set 402 that can be ignored. Thus, the compression rate for the measurement data may be low, e.g., 25%.

Figure 4B:
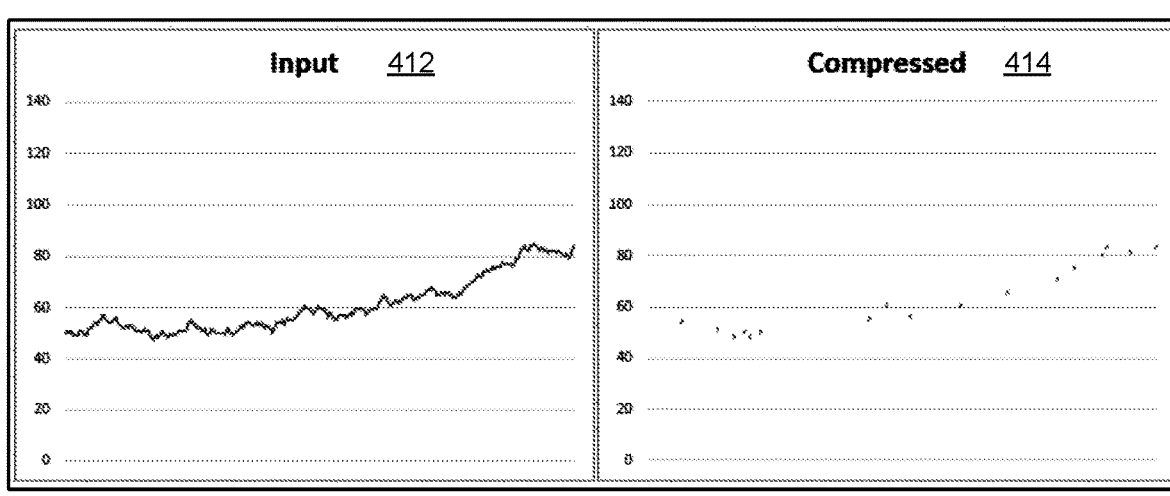
FIG. 4B depicts another example embodiment of a graph of measurement data before and after compression.

FIG. 4B depicts another example embodiment 410 of a graph of measurement data before and after compression. As illustrated in FIG. 4B, the original measurement data set 412 for a particular time interval is shown to be fairly level with minimal variation (e.g., no large peaks and valleys). The compressed data set 404, based on the original measurement data may exhibit similar trends, e.g., a level graph because much of the original measurement data can be ignored as being redundant so that it is not included in the compressed data set. Thus, the compression rate for the measurement data may be high, e.g., 90%.

Thus, as shown in FIG. 4A, a low compression rate may indicate an anomaly or abnormality with the operating state of the component. On the other hand, as shown in FIG. 4B, a high compression rate may indicate a normal operating state for the component.

Figure 5:
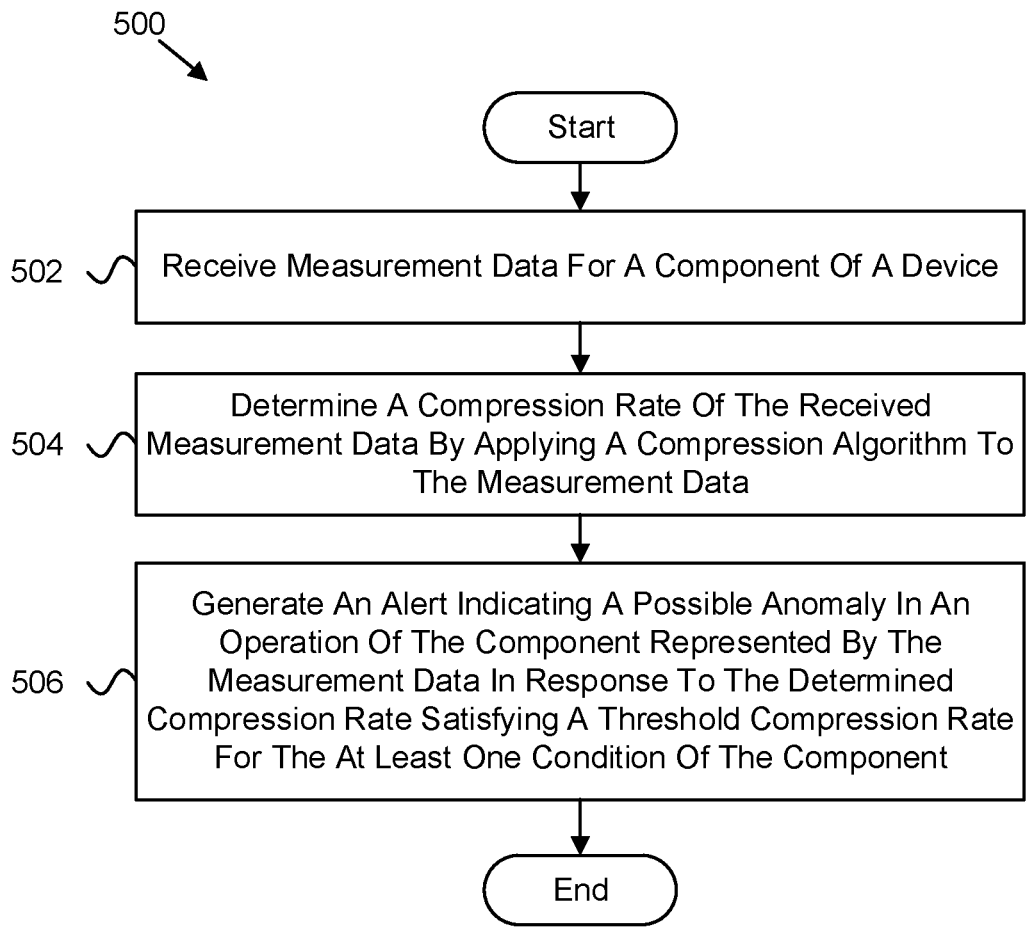
FIG. 5 is a schematic flow chart diagram illustrating one embodiment of a method for analytics-based anomaly detection.

FIG. 5 is a schematic flow chart diagram illustrating one embodiment of a method 500 for analytics-based anomaly detection. In one embodiment, the method 500 begins and receives 502, by a processor, measurement data for a component of a device. The measurement data may include measurements for at least one condition of the component that is monitored over a defined time interval.

In one embodiment, the method 500 determines 504 a compression rate of the received measurement data by applying a compression algorithm to the measurement data. In one embodiment, the compression rate indicates a compressed size of the measurement data as a result of applying the compression algorithm relative to an original size of the measurement data.

In one embodiment, the method 500 generates 506 an alert indicating a possible anomaly in an operation of the component represented by the measurement data in response to the determined compression rate satisfying a threshold compression rate for the at least one condition of the component, and the method 500 ends. In certain embodiments, satisfying the threshold compression rate indicates an abnormal operating state of the component. In one embodiment, the data receiving module 202, the compression rate module 204, and the alert module 206 perform the various steps of the method 500.

Figure 6:
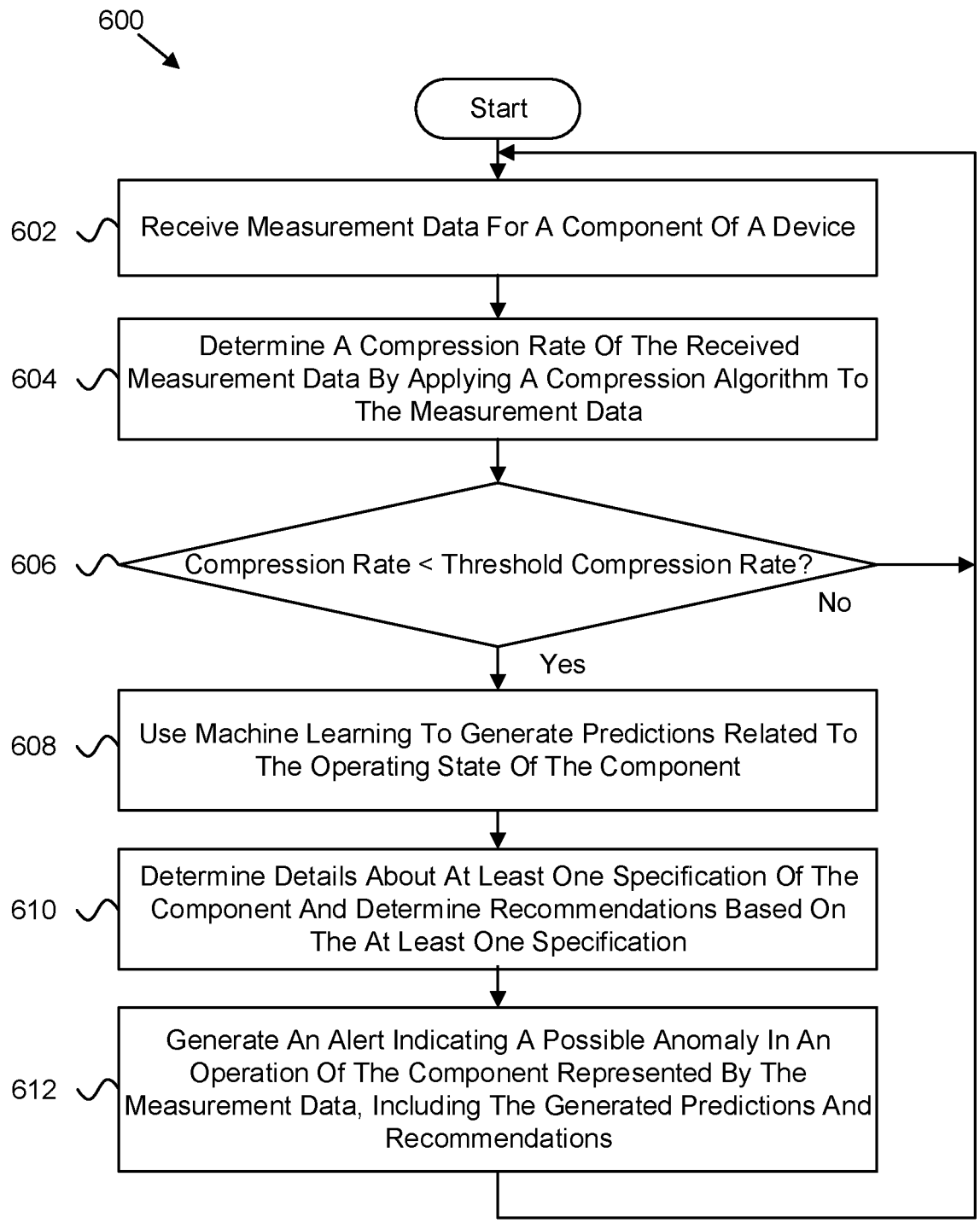
FIG. 6 is a schematic flow chart diagram illustrating one embodiment of another method for analytics-based anomaly detection.

FIG. 6 is a schematic flow chart diagram illustrating one embodiment of a method 600 for analytics-based anomaly detection. In one embodiment, the method 600 begins and receives 602, by a processor, measurement data for a component of a device. The measurement data may include measurements for at least one condition of the component that is monitored over a defined time interval.

In one embodiment, the method 600 determines 604 a compression rate of the received measurement data by applying a compression algorithm to the measurement data. In one embodiment, the compression rate indicates a compressed size of the measurement data as a result of applying the compression algorithm relative to an original size of the measurement data.

In further embodiments, the method 600 determines 606 whether the compression rate satisfies a threshold compression rate, e.g., is less than and/or equal to the threshold compression rate. If not, in one embodiment, the method 600 continues and receives 602 measurement data for the component.

Otherwise, in on embodiment, the method 600 uses 608 machine learning to generate predictions related to the operating state of the component based on the measurement data and/or the compression rate for the component. In further embodiments, the method 600 determines 610 details about at least one specification of the component and determines recommendations based on the at least one specification.

In some embodiments, the method 600 generates 612 an alert indicating a possible anomaly in an operation of the component represented by the measurement data, including the generated predictions and recommendations, and the method 600 continues and receives 602 measurement data for the component. In one embodiment, the data receiving module 202, the compression rate module 204, the alert module 206, and the machine learning module 304 perform the various steps of the method 600.

Figure 7:
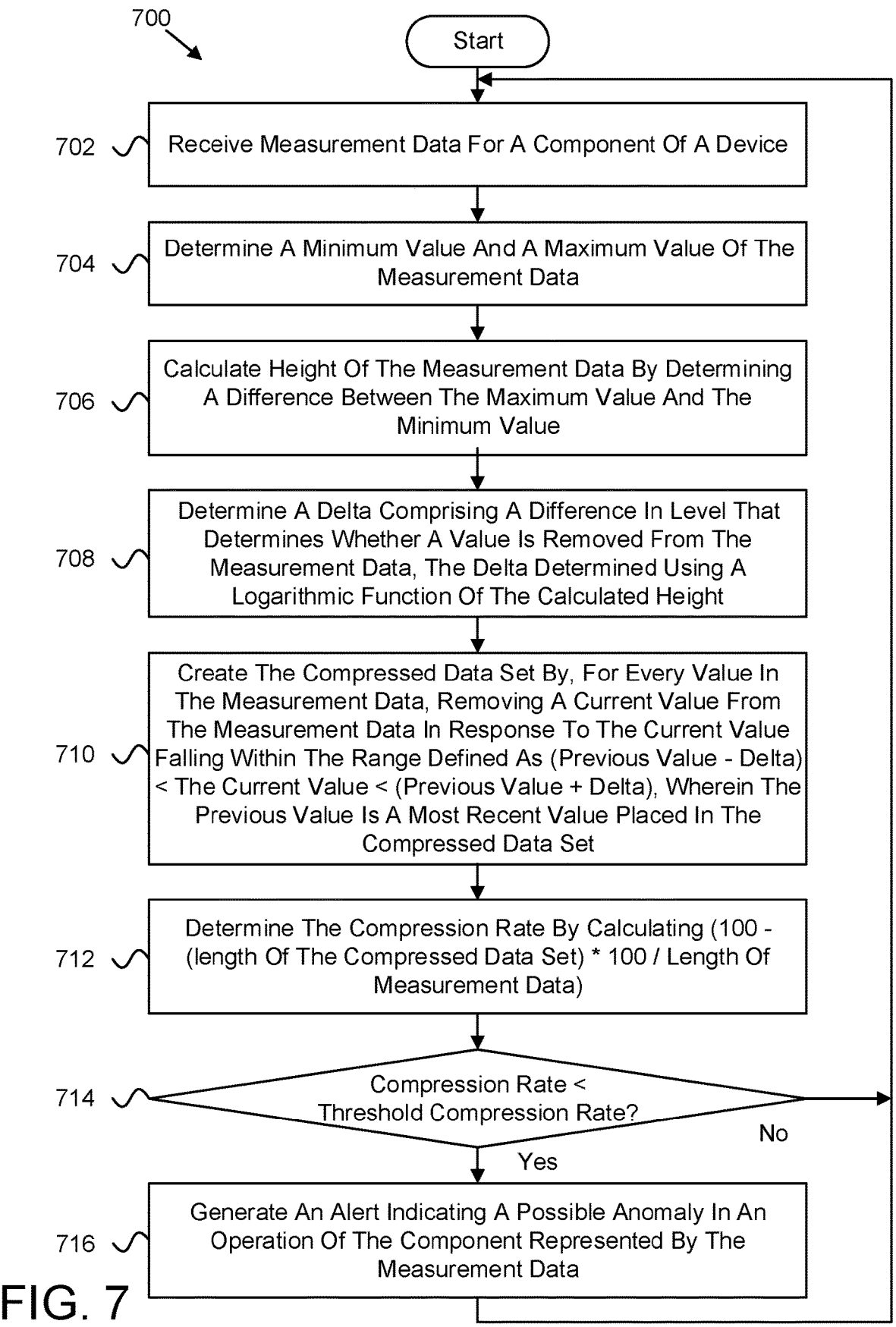
FIG. 7 is a schematic flow chart diagram illustrating one embodiment of another method for analytics-based anomaly detection.

FIG. 7 is a schematic flow chart diagram illustrating one embodiment of a method 700 for analytics-based anomaly detection. In one embodiment, the method 700 begins and receives 702, by a processor, measurement data for a component of a device. The measurement data may include measurements for at least one condition of the component that is monitored over a defined time interval.

In one embodiment, the method 700 determines 704 a minimum value and a maximum value of the measurement data. In some embodiments, the method 700 calculates 706 the height of the measurement data by determining a difference between the maximum value and the minimum value.

In one embodiment, the method 700 determines 708 a delta comprising a difference in level that determines whether a value is removed from the measurement data. The delta may be determined using a logarithmic function (e.g., $\log_2$) of the calculated height. In some embodiments, the method 700 creates 710 the compressed data set by, for every value in the measurement data, removing a current value from the measurement data in response to the current value falling within the range defined as (previous value−delta)<the current value<(previous value+delta), where the previous value is a most recent value placed in the compressed data set.

In one embodiment, the method 700 determines 712 the compression rate by calculating (100−(length of the compressed data set)*100/length of measurement data). In various embodiments, the method 700 determines 714 whether the compression rate satisfies a threshold compression rate, e.g., is less than and/or equal to the threshold compression rate. If not, in one embodiment, the method 700 continues and receives 702 measurement data for the component.

Otherwise, in on embodiment, the method 700 generates 716 an alert indicating a possible anomaly in an operation of the component represented by the measurement data in response to the determined compression rate satisfying a threshold compression rate for the at least one condition of the component, and the method 700 ends. In certain embodiments, satisfying the threshold compression rate indicates an abnormal operating state of the component. In one embodiment, the data receiving module 202, the compression rate module 204, and the alert module 206 perform the various steps of the method 700.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a non-volatile memory that stores code executable by the processor to:
receive measurement data for a component of a device in real-time, the measurement data comprising measurements for at least one condition of the component that is monitored over a defined time interval;
determine, dynamically, a compression rate of the received real-time measurement data by applying a compression algorithm to the measurement data, the compression rate indicating a compressed size of the measurement data as a result of applying the compression algorithm relative to an original size of the measurement data; and
generate an alert indicating a possible anomaly in an operation of the component represented by the measurement data in response to the determined compression rate satisfying a threshold compression rate for the at least one condition of the component, wherein satisfying the threshold compression rate indicates an abnormal operating state of the component.

2. The apparatus of claim 1, wherein the compression algorithm that is used to determine the compression rate for the measurement data is configured to create a compressed data set by identifying and storing values that fall outside of a range that is dynamically calculated for each value in the measurement data based on a height of the measurement data.

3. The apparatus of claim 1, wherein the compression algorithm determines the compression rate by:
determining a minimum value and a maximum value of the measurement data;
calculating a height of the measurement data by determining a difference between the maximum value and the minimum value;
determining a delta comprising a difference in level that determines whether a value is removed from the measurement data, the delta determined using a logarithmic function of the calculated height;
creating the compressed data set by, for every value in the measurement data, removing a current value from the measurement data in response to the current value falling within the range defined as (previous value−delta)<the current value <(previous value+delta), wherein the previous value is a most recent value placed in the compressed data set; and
determining the compression rate by calculating (100−(length of the compressed data set)*100/length of measurement data).

4. The apparatus of claim 1, wherein the code is executable by the processor to:
receive new measurement data for the component on a continuous basis;
determine a new compression rate, using the compression algorithm, based on the received new measurement data; and
generate an alert in response to the determined new compression rate satisfying the threshold compression rate for the at least one condition of the component.

5. The apparatus of claim 1, wherein the code is executable by the processor to:
check an operating state of at least one other component of the device that is related to the component for a same time interval in response to the determined compression rate satisfying the threshold compression rate; and
generate the alert in response to the operating state being normal for the at least one other component of the device for the same time interval.

6. The apparatus of claim 1, wherein the code is executable by the processor to:
check for system alerts associated with the component that are triggered during a same time interval in response to the determined compression rate satisfying the threshold compression rate; and
generate the alert in response to other system alerts associated with the component being triggered for the same time interval.

7. The apparatus of claim 1, wherein the code is executable by the processor to use machine learning to analyze the measurement data and the determined compression rate to generate at least one prediction associated with the operating state of the component, the prediction associated with an operating state of the component and provided as part of the generated alert.

8. The apparatus of claim 7, wherein the machine learning is trained using training data that comprises measurement and other operating data from a plurality of different devices that have components that are comparable to the components of the device.

9. The apparatus of claim 7, wherein the code is executable by the processor to predict, using the machine learning, an estimate of when the component that generated the alert will fail, the determined estimate provided as part of the generated alert.

10. The apparatus of claim 7, wherein the code is executable by the processor to predict, using the machine learning and based on the measurement data and the determined compression rate, a cost of operation for the device, the cost of operation comprising a per-user cost of the device in a hardware-as-a-service environment.

11. The apparatus of claim 1, wherein the code is executable by the processor to determine a severity level for the generated alert based on the determined compression rate relative to one of a plurality of different compression rate thresholds, wherein different severity levels are each associated with one of the plurality of different compression rate thresholds.

12. The apparatus of claim 11, wherein the code is executable by the processor to determine one or more recommendations associated with the component based on the severity level for the generated alert.

13. The apparatus of claim 1, wherein the code is executable by the processor to determine the threshold compression rate based on at least one of user input, a set of baseline measurement data that is received when the component is installed, manufacturer specifications for the component, and measurement data for related components.

14. The apparatus of claim 1, wherein the code is executable by the processor to include details about at least one specification of the component as part of the generated alert and provide at least one recommendation for correcting the possible anomaly in the component based on the details about the at least one specification.

15. A method, comprising:
receiving, by a processor, measurement data for a component of a device in real-time, the measurement data comprising measurements for at least one condition of the component that is monitored over a defined time interval;

determining, dynamically, a compression rate of the received real-time measurement data by applying a compression algorithm to the measurement data, the compression rate indicating a compressed size of the measurement data as a result of applying the compression algorithm relative to an original size of the measurement data; and generating an alert indicating a possible anomaly in an operation of the component represented by the measurement data in response to the determined compression rate satisfying a threshold compression rate for the at least one condition of the component, wherein satisfying the threshold compression rate indicates an abnormal operating state of the component.

16. The method of claim 15, wherein the compression algorithm that is used to determine the compression rate for the measurement data is configured to create a compressed data set by identifying and storing values that fall outside of a range that is dynamically calculated for each value in the measurement data based on a height of the measurement data.

17. The method of claim 15, further comprising:
receiving new measurement data for the component on a continuous basis;
determining a new compression rate, using the compression algorithm, based on the received new measurement data; and
generating an alert in response to the determined new compression rate satisfying the threshold compression rate for the at least one condition of the component.

18. The method of claim 15, further comprising:
checking for system alerts associated with the component that are triggered during a same time interval in response to the determined compression rate satisfying the threshold compression rate; and
generating the alert in response to other system alerts associated with the component being triggered for the same time interval.

19. The method of claim 15, further comprising using machine learning to analyze the measurement data and the determined compression rate to generate at least one prediction associated with the operating state of the component, the prediction associated with an operating state of the component and provided as part of the generated alert.

20. A program product comprising a non-volatile computer readable storage medium and program code, the program code being configured to be executable by a processor to perform operations comprising:
receiving measurement data for a component of a device in real-time, the measurement data comprising measurements for at least one condition of the component that is monitored over a defined time interval;
determining, dynamically, a compression rate of the received real-time measurement data by applying a compression algorithm to the measurement data, the compression rate indicating a compressed size of the measurement data as a result of applying the compression algorithm relative to an original size of the measurement data; and
generating an alert indicating a possible anomaly in an operation of the component represented by the measurement data in response to the determined compression rate satisfying a threshold compression rate for the at least one condition of the component, wherein satisfying the threshold compression rate indicates an abnormal operating state of the component.

* * * * *